United States Patent
Ehrlich et al.

(10) Patent No.: US 7,061,708 B2
(45) Date of Patent: Jun. 13, 2006

(54) SYSTEMS AND METHODS FOR CONDITIONAL SERVOWRITING

(75) Inventors: Richard M. Ehrlich, Saratoga, CA (US); Thorsten Schmidt, Milpitas, CA (US)

(73) Assignee: Matsushita Electric Industrial Inc., Osaka (JP)

( * ) Notice: Subject to any disclaimer, the term of this patent is extended or adjusted under 35 U.S.C. 154(b) by 37 days.

(21) Appl. No.: 11/013,075

(22) Filed: Dec. 15, 2004

(65) Prior Publication Data

US 2005/0141124 A1 Jun. 30, 2005

Related U.S. Application Data

(60) Provisional application No. 60/532,429, filed on Dec. 24, 2003, provisional application No. 60/532,589, filed on Dec. 24, 2003.

(51) Int. Cl.
*G11B 21/02* (2006.01)
*G11B 5/596* (2006.01)
*G11B 5/09* (2006.01)

(52) U.S. Cl. .................. 360/75; 360/77.08; 360/48
(58) Field of Classification Search .............. None
See application file for complete search history.

(56) References Cited

U.S. PATENT DOCUMENTS

| | | | |
|---|---|---|---|
| 5,825,578 A * | 10/1998 | Shrinkle et al. | 360/77.08 |
| 6,061,200 A | 5/2000 | Shepherd et al. | 360/77.04 |
| 6,069,764 A | 5/2000 | Morris et al. | 360/77.04 |
| 6,963,458 B1 * | 11/2005 | Lamberts | 360/31 |
| 2004/0123025 A1* | 6/2004 | Chainer et al. | 711/112 |

* cited by examiner

*Primary Examiner*—Andrew L. Sniezek
(74) *Attorney, Agent, or Firm*—Fliesler Meyer, LLP.

(57) ABSTRACT

Embodiments of the present invention determine the offset of a first burst of a burst pair from a centerline. This can be used to determine the desired offset position for a second burst of the burst pair. The target signal to provided the data storage unit for writing the second burst can take into account the transfer function of the controller and the physical plant so as to more accurately write at the desired offset position.

20 Claims, 6 Drawing Sheets

SYSTEMS AND METHODS FOR CONDITIONAL SERVOWRITING

CLAIM OF PRIORITY

This application claims priority to U.S. Provisional Application No. 60/532,429 entitled "System for Adjusting Targeting Locations in Servowriting" filed Dec. 24, 2003, and U.S. Provisional Application No. 60/532,589 entitled "Methods for Adjusting Targeting Locations in Servowriting" filed Dec. 24, 2003.

FIELD OF THE INVENTION

The present invention relates to servowriting processes, systems, and devices.

BACKGROUND

Advances in data storage technology have provided for ever-increasing storage capability in devices such as DVD-ROMs, optical drives, and disk drives. In hard disk drives, for example, the width of a written data track has decreased due in part to advances in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

In existing servowriting techniques, servowriting passes or steps can be stopped and restarted because of a detected displacement while servowriting. Previously written servo information before the displacement during the step or pass may be written again or erased and then written again. While writing a track of servo information, manufacturers may restart writing the track each time the head is out of position. Much time can be spent restarting operations until the head is in an acceptable position while writing an entire track.

BRIEF SUMMARY

An embodiment of the present invention concerns using indications of an offset of a first burst in a burst pair from a centerline to control the placement of a second burst of the burst pair. In one embodiment, the data storage device tries to write the second burst equidistant from a centerline as the first burst. The transfer characteristics of the data storage device can determined and used to help control the writing of the second burst in the desired pattern.

Other features, aspects, and objects of the invention can be obtained from a review of the specification, the figures, and the claims.

DETAILED DESCRIPTION

Figure 1:
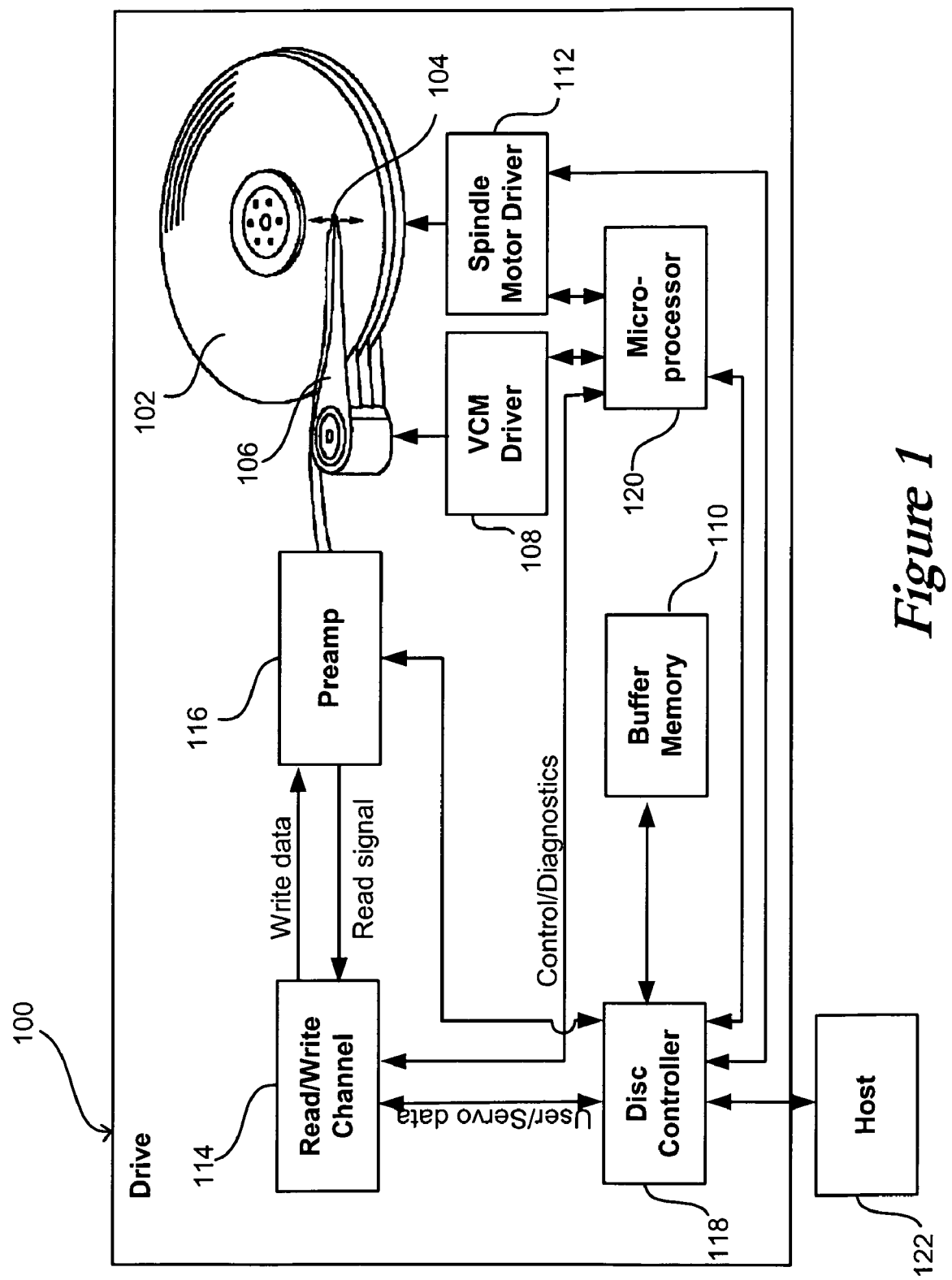
FIG. 1 is a functional diagram showing components of a disk drive that can be used in accordance with embodiments of the present invention.

Systems and methods in accordance with various embodiments of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer memory 110, read channel 114, and a host 122. A host can be any device, apparatus, or system capable of utilizing the data storage device, such as a personal computer or Web server or consumer electronics device. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118. A controller for the data storage device can include the disk controller 128 and/or processor 120. The controller can be on one or multiple chips. In one embodiment, a controller chip contains SRAM while DRAM and FLASH are external to the chip. Other memory arrangements can also be used.

Figure 2:
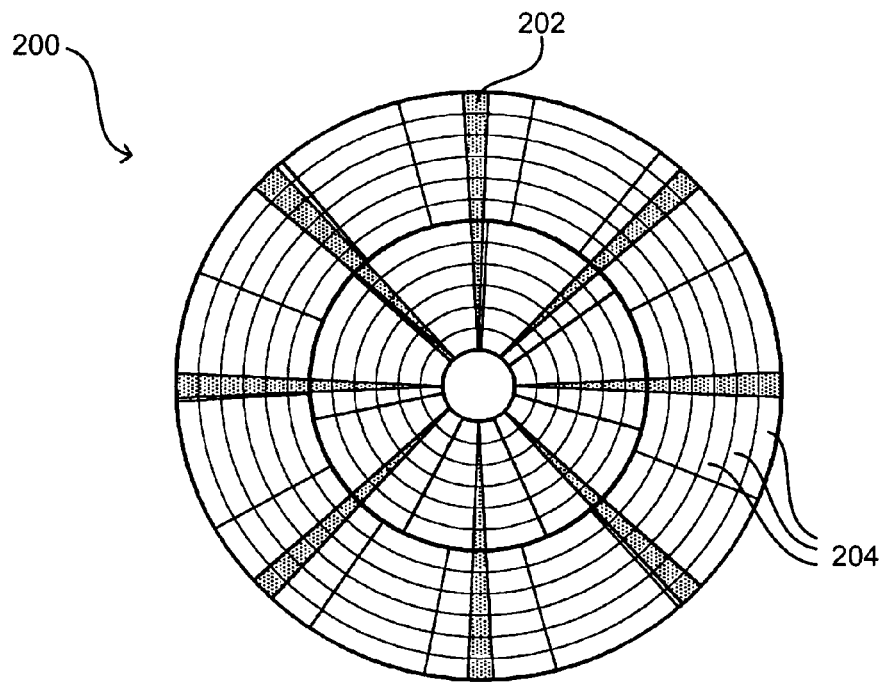
FIG. 2 is a diagram showing an example of a data and servo format for a disk in the drive of FIG. 1.

The information stored on disks can be written in concentric tracks, extending from near the inner diameter (ID) of the disk to near the outer diameter (OD) of the disk 200, as shown in the example disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter of the disk to the outer diameter, but may be curved slightly in order to adjust for the trajectory of the head as it sweeps across the disk.

The servo information often includes bursts of transitions called "servo bursts." A boundary or burst boundary as used herein does not mean or imply that servo bursts forming a boundary necessarily have a substantially common edge as the bursts can be spaced such that there is a gap radially or circumferentially between the bursts. The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes and/or phases of the bursts, or a subset of those bursts. The position of a head or element, such as a read/write head or element, relative to a target or desired location such as the center of a track or other desired location, will be referred to herein as position-error. Position-error distance may be used to refer to the distance between a target or desired location and an actual or predicted location of a head or element. The signal generated as a head or element moves across servo bursts or boundaries between servo bursts is often referred to as a position-error signal (PES). The PES can be used to represent a position of the head or element relative to a target location such as a track centerline defined by a boundary between servo bursts.

Figure 3:
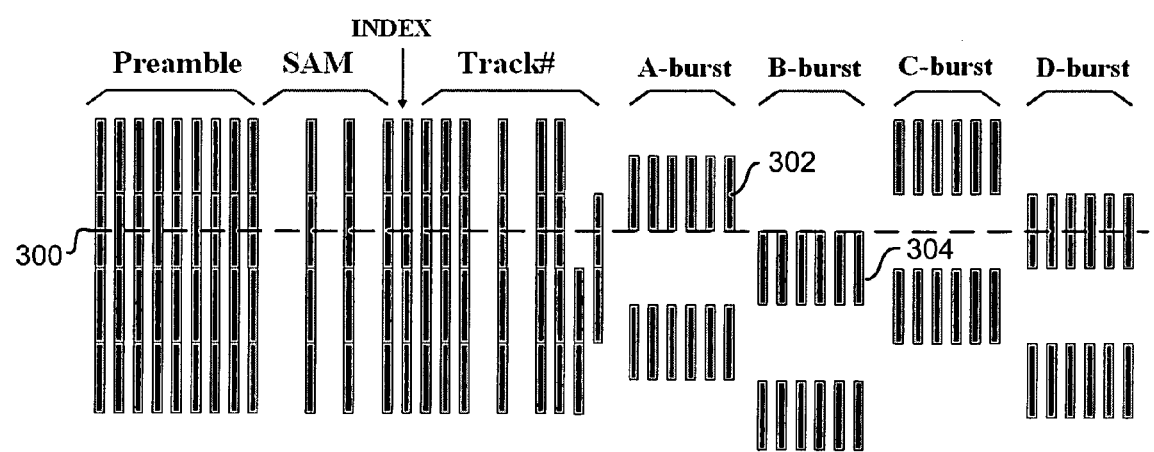
FIG. 3 is a diagram showing servo information that can be written to the tracks shown in FIG. 2.

A centerline 300 for a given data track can be "defined" relative to a series of bursts, burst edges, or burst boundaries, such as a burst boundary defined by the lower edge of A-burst 302 and the upper edge of B-burst 304 in FIG. 3. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero and represent a position at track center if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

For example, a centerline 300 for a given data track can be "defined" relative to a series of bursts, burst edges, or burst boundaries, such as a burst boundary defined by the lower edge of A-burst 302 and the upper edge of B-burst 304 in FIG. 3. The centerline can also be defined by, or offset relative to, any function or combination of bursts or burst patterns. As a non-limiting example, a centerline defined by four bursts can be referred to as "4-burst-centerline" as described for example, in U.S. Pat. No. 5,381,281 entitled "Disk Drive System Using Multiple Embedded Quadrature Servo Fields", by Louis J. Shrinkle, et al, filed Jun. 24, 1993. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The servo scheme described above is one of many possible schemes for combining the track number read from a servo wedge and the phases and/or amplitudes of the servo bursts. Many other schemes are possible that can benefit from embodiments in accordance with the present invention.

A problem that exists in the reading and writing of servo patterns involves the misplacement, or offset, of a read/write head with respect to the ideal and/or actual position of a track. It is impossible to perfectly position a head with respect to a track for each rotation of a disk, as there is almost always a noticeable offset between the desired position and the actual position of the head with respect to the disk. This can cause problems when servowriting servo patterns, as each portion of the pattern can be slightly misplaced. This can lead to what is referred to as written-in runout. Written-in runout can be thought of as the offset between the "actual" centerline, or desired radial center, of a track and the centerline that would be determined by a head reading the written servo pattern. Written-in runout can lead to servo performance problems, wasted space on a disk and, in a worst case, unrecoverable or irreparably damaged data.

It will be understood that various self-servowriting techniques can benefit from embodiments in accordance with the present invention. One such self-servowriting technique is often referred to as "replication" self-servowriting. In one embodiment of replication self-servowriting, a media-writer can be used to write servo information on a stack of disks. Each disk can then be placed in a separate drive having multiple blank disks, such that the drive can use the patterned disk as a reference to re-write servo patterns on all of the other disk surfaces in the drive, as well as writing a servo pattern on the patterned surface, if desired. In other embodiments, a magnetic transfer process (sometimes referred to as "magnetic printing") can be use to transfer a pattern to one surface of a disk, which can then be used as a reference pattern for re-writing.

Another class of self-servowriting techniques is known as "propagation" self-servowriting. Techniques in this class differ from those in the replication class in the fact that the wedges servowritten by the drive at one point in the process are later used as reference wedges for other tracks. These schemes are thus "self-propagating." Typically, such techniques require a R/W head that has a large radial offset between the read and write elements, so that the drive can servo with the read element over previously-written servo wedges while the write element is writing new servo wedges. In one such application, a servowriter is used for a short time to write a small "guide" pattern on a disk that is already assembled in a drive. The drive then propagates the pattern across the disk. In this type of self-servowriting operation, previously written tracks can later serve as reference tracks.

At each track to be servowritten, it can be desirable to remove the synchronous runout of the reference pattern as much as possible. Several techniques exist for removing synchronous runout that are known to those skilled in the art. After substantially removing the synchronous runout, each head should be following substantially circular tracks on the respective disks. The remaining runout of each head should then be dominated by non-synchronous runout suffered by the reference head, or the head observing the reference surface, from which the position of the head-stack is controlled. The head stack assembly (HSA) typically refers to the combination of the actuator, voice coil motor (VCM), E-block (arms of the actuator), suspensions, and heads. The HSA is typically one of two major moving parts of a drive, with the other moving part being the spindle and disks, referred to as the "disk-stack." There may be other contributors to the remaining runout for the R/W heads that is not common to that suffered by the reference head. Typically, these contributors will be relatively small.

Figure 4:
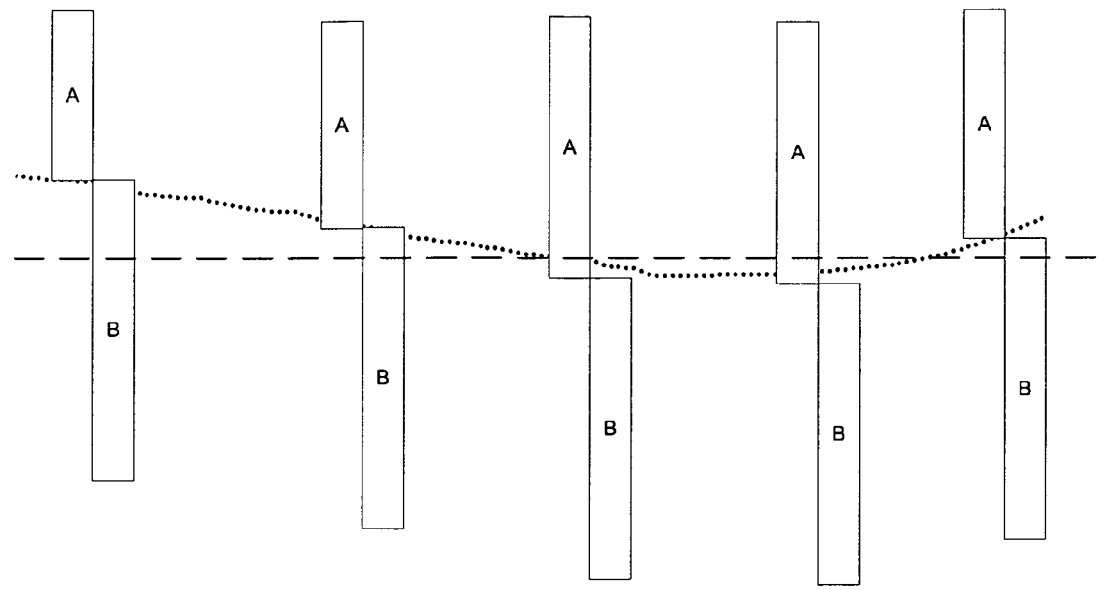
FIG. 4 is a diagram showing displacement of servo bursts in a prior art system.

FIG. 4 shows an example of a pattern wherein the remaining runout is dominated by non-synchronous runout suffered by the reference head. Misplacement of the head during servowriting results in position errors for the lower edges of the majority of the A-bursts and the upper edges of the majority of the B-bursts. This can cause a subsequent read or write operation on the track defined by these bursts to misread data, as the head will be offtrack, or misplaced, during much of the read or write operation.

While the final servo wedges (reference 202 in FIG. 2) are being written for each head, the position measurements from the reference head, or a servo position signal, can indicate approximately how much each head is misplaced with respect to track center. For example, looking at FIG. 1, a signal from the head 104 reading the reference pattern can be passed as servo data through the read/write channel 114 to the disk controller 118, and passed on to the microprocessor 120, which can send commands to the VCM driver 108, in order to attempt to move the head back into position relative to the track. The measured PES can also be analyzed and used to determine whether the write element should write and/or trim servo information. The position measurements from the reference pattern will probably be non-zero, primarily due to imperfect control of the servo position of the reference head, and can be used to determine whether servo information should be written and/or trimmed. The PES can be used to determine or predict if a location of to-be-written servo information will be within specified limits. If the location is not within specified limits, writing of servo information can be disabled. The PES can also be used to determine if a location of the write element (actual or predicted) is within specified limits for performing trim operations on any previously written servo information. Any number of parameters can be used to determine if a servowriting operation should proceed, including a position of the write element, a predicted position of the write element, or a predicted position of to-be-written and/or trimmed servo information.

One embodiment of the present invention concerns the determination of an indication of offset of a servowritten position of a first burst of a burst pair from a desired location. In one embodiment, the first burst is servowritten, which can include write and/or trim steps. An indication of the offset at the time of writing and/or trimming the burst, such as an error signal (PES), can be used as an indication. This indication can be used to determine an offset location for writing and/or trimming a second portion, such as a second burst, of the burst pair. The offset location for a number of the second bursts can comprise an offset pattern.

Figure 5:
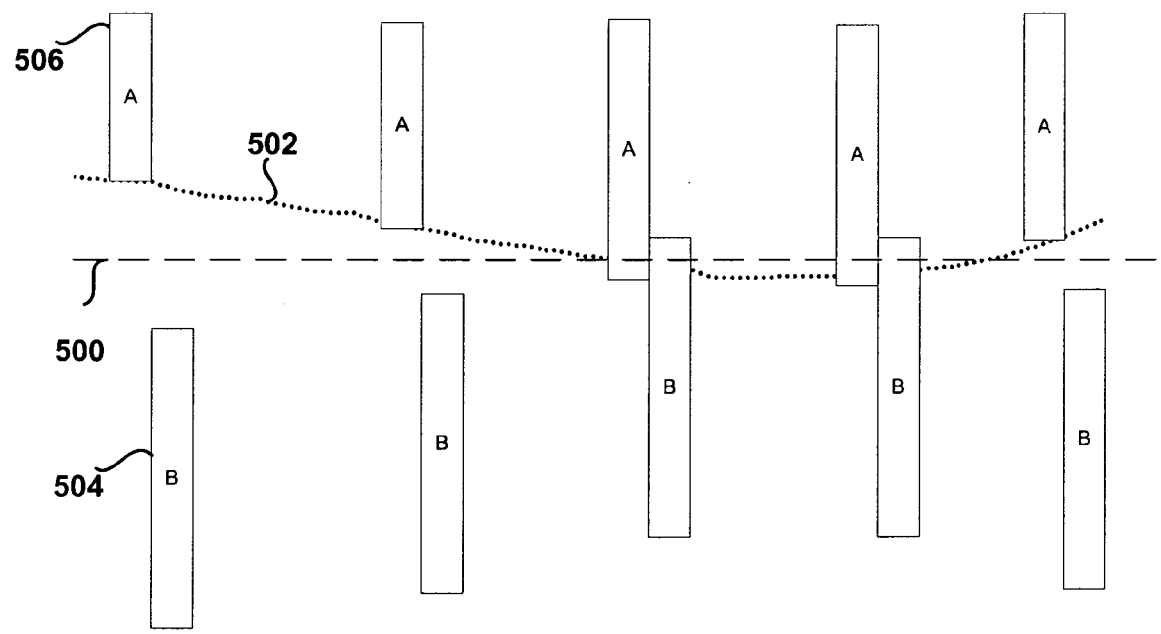
FIG. 5 is a diagram of the placement of servo bursts in one embodiment of the present invention.

FIG. 5 illustrates an example of one embodiment of the present invention. In this example, the controller tries to servowrite A bursts along the centerline 500. In this case, after a trim step, the A bursts are servowritten along line 502. To compensate for the offset of the A burst 506 from the center line, the desired position for B burst 504 is equidistant from the centerline 500. The written position of the A busts 506 can be determined by the position error signal (PES) when the A burst 506 is servowritten, such as in a trim step. The desired offset of B burst 504 can then be determined. When the centerline 500 is equidistant from A burst 506 and B burst 504, the position of the read head with respect to the centerline 500 can be determined based upon where the detected signal is equal for the A burst 506 or B burst 504.

In one embodiment, the servowriting of the A-bursts, such as A burst 506 follows the path shown by the dotted line in the FIG. 5. Then, during the next pass, we can compute a target path (not shown), which would get the writer to follow an actual path which causes us to write the B-bursts where they are shown in the FIG. 5. The intentional "miss-placement" of the B-bursts results in a properly placed track centerline. In the example of FIG. 5, we are assuming that when we wrote the A-burst, while we may have had some misplacement, the writer is wide enough that the lower edge of that burst is always low enough that we would want to trim off some part of it.

Figure 6A:
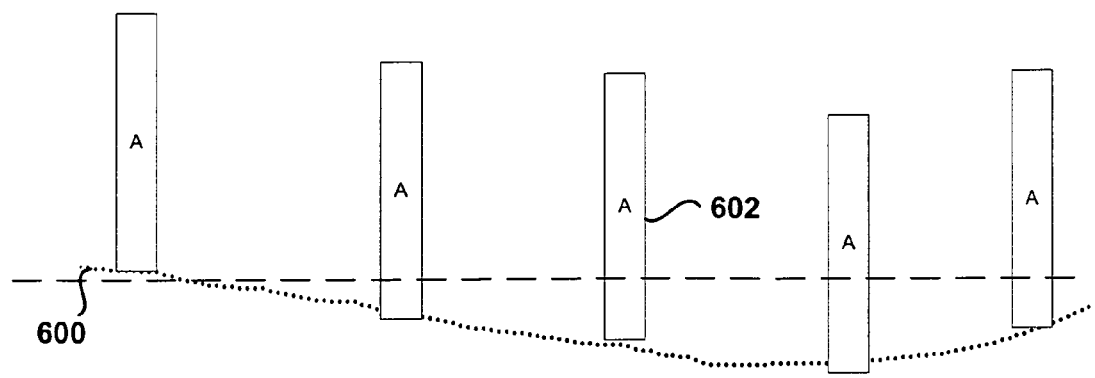
FIGS. 6A–6C are diagrams of the placement of servo bursts in another embodiment of the present invention.
Figure 6B:
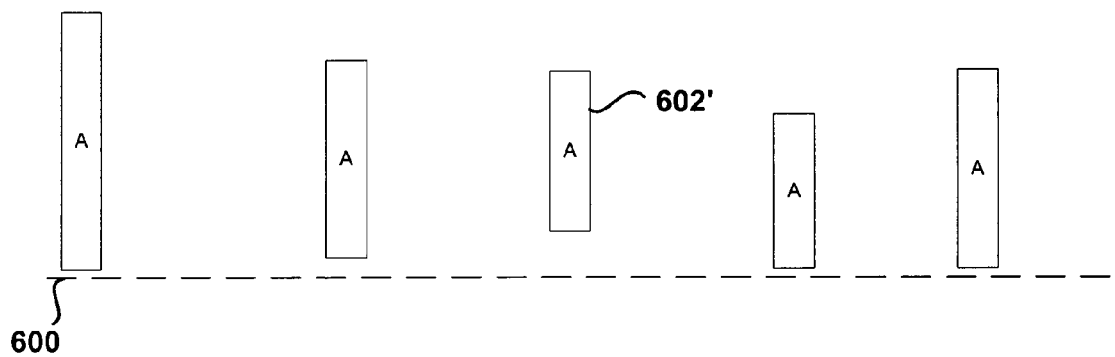
Figure 6C:
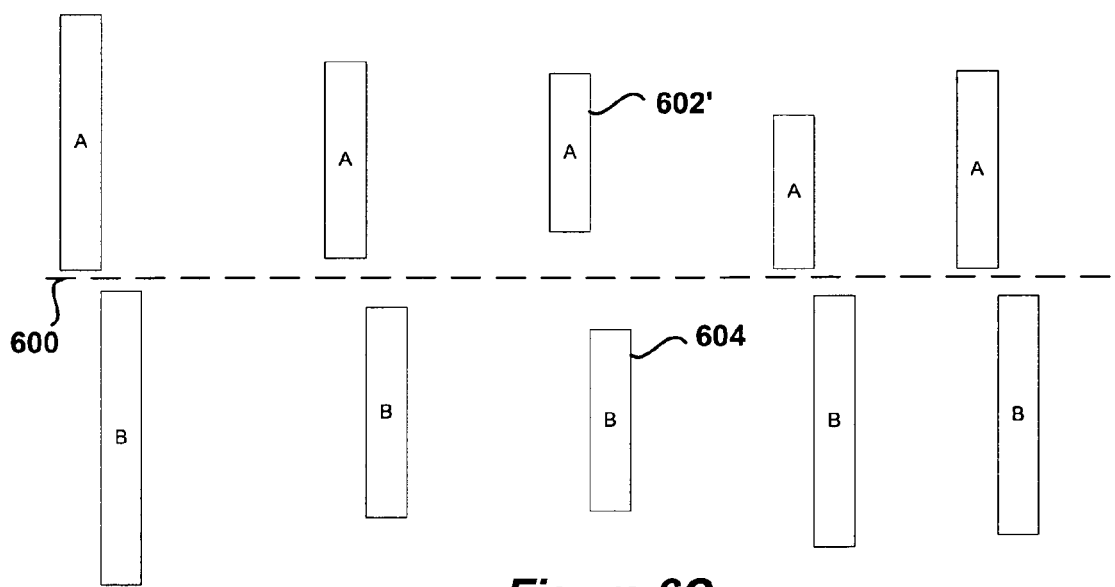

The examples of FIG. 6A–6C illustrate the operation of the embodiments of the present invention, which use a trim operation. In this example, the servowriting step for writing the A burst is considered to include a trim operation. In FIG. 6A, A bursts are written first. In FIG. 6B, a trim step is done. It is desired that the trim step be done along the dotted line. In this example, however, the trim step has a slight offset such that A burst 602' is not adjacent to the centerline 600. FIG. 6C illustrates how the PES for the trim operation can define a desired offset position for writing of the corresponding B bursts 604 in each burst pair.

In one embodiment, the first and second burst are part of a burst pair. In one embodiment, the first and second bursts are in separate burst pairs. For example, in one embodiment, a track line can be determined midway between an A/B burst pair transition and a C/D burst pair transition in the "four burst centerline" case described above. The first and second burst could, in that case, be in different burst pairs. For example, C and/or D bursts could be written with offsets to compensate for a missalignment of A and/or B bursts.

The indications of the offset of a first burst edge can be used along with additional information to determine the offset location to write a second burst. The additional information can be an indication of a position of an edge of other bursts. For the "four burst centerline" case described above, the servowritting of C and/or D bursts can use information on the position of A and B burst edges.

Figure 7:
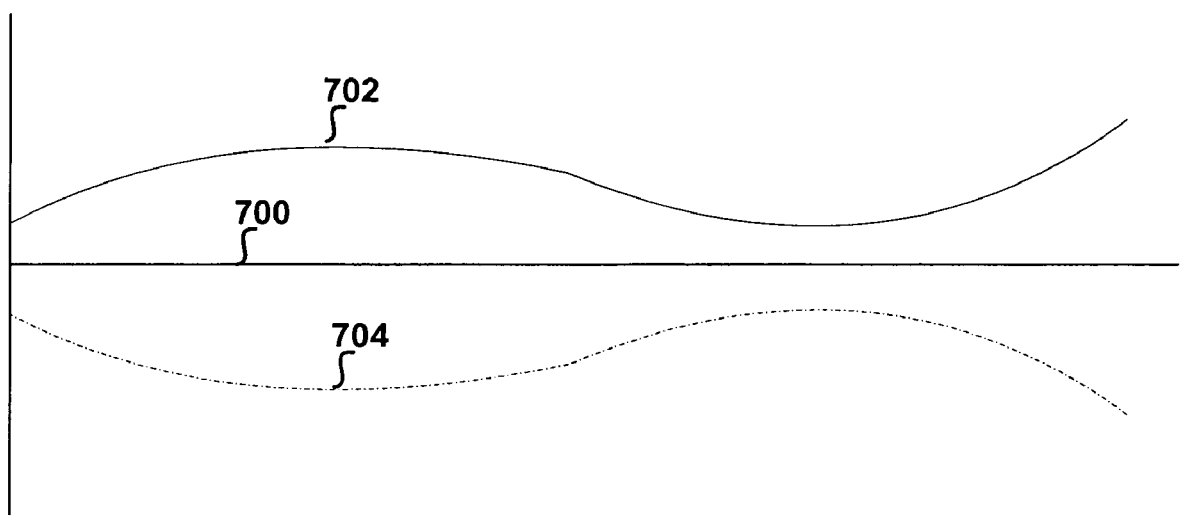
FIG. 7 is a diagram illustrating the offset of first bursts and the desired location for second bursts

FIG. 7 illustrates an A burst line 702 (that is, a line which shows the trimmed lower edges of all of the A-bursts on a given track). The desired location for writing the B bursts is along the inverted offset pattern line 704. In a preferred embodiment, the offset pattern 704 is equidistant from the centerline 700 as the offset pattern 702. The desired position for writing the bursts follows a curve rather than a straight line. This mean that transfer function of the data storage device needs to be taken into account to determine the signal supplied to the actuator.

Figure 8:
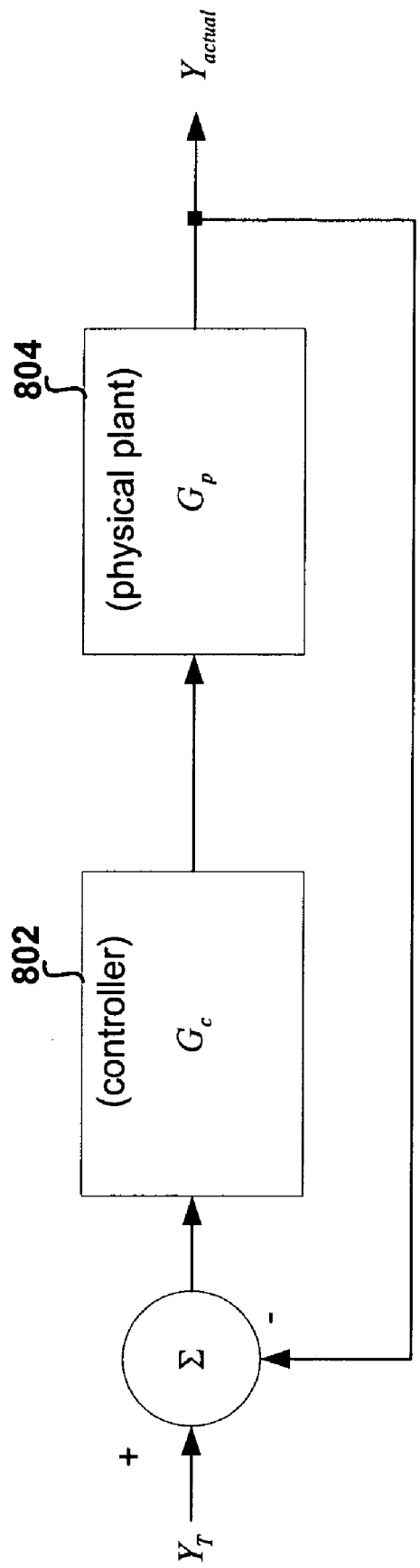
FIG. 8 is a functional diagram illustrating a transfer function of a data storage device.

For the model of FIG. 8, when the control has a transfer function $G_c$ and the physical plant has a transfer function $G_p$, the system transfer function is:

$$\frac{\overline{Y}_{actual}}{\overline{Y}_T} = \frac{G_c G_p}{1 + G_c G_p}$$

The above quantity is often referred to as the "closed-loop transfer-function" of the servo loop. This means if a desired path needs to be followed, the contributions of the controller 802 and the physical plant 804 need to be taken into consideration. The frequency domain equation of the target function needed for the desired sequence is:

$$\overline{Y}_T = \left(\frac{1 + G_c G_p}{G_c G_p}\right) \overline{Y}_{desired}$$

The quantity, $$\left(\frac{1 + G_c G_p}{G_c G_p}\right),$$

will be referred to as the "inverse closed-loop transfer-function" of the servo loop. This corresponds to the time domain equation for the circular convolution of:

where $h_k$ are the impulse responses that can be determined from the frequency response and N is the number of wedges per revolution.

$$h_k \equiv \frac{1}{N} \sum_{m=0}^{M-1} \left[\frac{1 + G_c(m) G_p(m)}{G_c(m) G_p(m)}\right] e^{j2\pi mk/N}$$

The above formula for $h_k$ will be recognized by those skilled in the art as the inverse-DFT of the above-mentioned "inverse closed-loop transfer-function" of the servo loop.

For frequencies at which the open-loop gain of the servo-loop is small, following a desired path may require very large excursions in the target path. As would be known to those skilled in the art, the open-loop gain of the system pictured in FIG. 8 is:

$$G_{ol}(m) \equiv G_c(m) G_p(m)$$

where m is a frequency-index. Since the open-loop gain of a servo loop is typically very large at low frequencies and generally decreases with increasing frequency, it may be advantageous to compute an approximation to $h_k$ with a limited summation:

$$h_k \equiv \frac{1}{N} \sum_{m=0}^{M-1} \left[\frac{1 + G_c(m) G_p(m)}{G_c(m) G_p(m)}\right] e^{j2\pi mk/N} +$$

-continued $$\frac{1}{N} \sum_{m=N-M}^{N-1} \left[\frac{1 + G_c(m) G_p(m)}{G_c(m) G_p(m)}\right] e^{j2\pi mk/N}$$

where M<N/2, so that the impulse-response used to compute target trajectories from desired trajectories does not cause the servo to attempt to follow very high-frequency perturbations in the trajectory. In one embodiment, frequencies other than just high frequencies can be left out. The below equation shows a version with the K'th harmonic of the spin speed removed.

$$h_k = \frac{1}{N} \sum_{m=0}^{K-1} \left[\frac{1 + G_c(m) G_p(m)}{G_c(m) G_p(m)}\right] e^{j2\pi mk/N} +$$

$$\frac{1}{N} \sum_{m=K+1}^{N-K-1} \left[\frac{1 + G_c(m) G_p(m)}{G_c(m) G_p(m)}\right] e^{j2\pi mk/N} +$$

$$\frac{1}{N} \sum_{m=N+1-K}^{N-1} \left[\frac{1 + G_c(m) G_p(m)}{G_c(m) G_p(m)}\right] e^{j2\pi mk/N}$$

In one embodiment, the frequency response of the data storage unit can be characterized in self-test. The controller can then calculate the time domain target values for any individual servowriting-step once the corresponding desired offset values are known.

Although various embodiments of the present invention, including exemplary and explanatory methods and operations, have been described in terms of multiple discrete steps performed in turn, the order of the descriptions should not necessarily be construed as to imply that the embodiments are order dependent. Where practicable for example, various operations can be performed in alternative orders than those presented herein.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system to write a track of servo information to a rotatable storage medium of a data storage device, comprising:
   a write element to write servo information to the rotatable storage medium;
   a controller to control servowriting of servo information to the rotatable storage medium, the controller to:
   determine an indication of an offset of a servowritten position of an edge of a first burst from a desired location; and
   use the indication to determine an offset location for writing a second burst.

2. The system of claim 1, wherein the first and second burst are part of a burst pair.

3. The system of claim 1, wherein the indication is used along with additional information to determine the offset location.

4. The system of claim 3, wherein the additional information is an indication of a position of an edge of another burst.

5. The system of claim 1, wherein the controller attempts to write the second burst at the offset location.

6. The system of claim 1, wherein the transfer characteristics of the data storage device are used to target the writing of the second portion.

7. The system of claim 1, wherein the indication is a position error signal value at the writing the of the first burst.

8. The system of claim 1, wherein a servowriting of first burst includes a trim operation.

9. The system of claim 8, wherein the indication relates to the trim operation.

10. The system of claim 1, wherein the burst pair is an A/B burst pair.

11. The system of claim 10, wherein the offset location is such that the A burst and B burst would be equidistant from a desired centerline.

12. The system of claim 1, wherein the desired location is along a desired centerline.

13. The system of claim 1, where the offset of the edge of the first burst contains a DC component,
so that the target offset used to write the second burst also contains a DC offset.

14. A system to write a track of servo information to a rotatable storage medium of a data storage device, comprising:
a write element to write servo information to the rotatable storage medium;
a controller to control servowriting of servo information to the rotatable storage medium, the controller to:
control the servowriting of first bursts along a track
determine indications of offsets of the edges of the first bursts from a desired track position; and
use the indications to determine an offset pattern for writing second bursts.

15. The system of claim 14, wherein the first and second bursts are part of a burst pairs.

16. The system of claim 14, wherein the indication is used along with additional information to determine the offset location.

17. The system of claim 16, wherein the additional information is an indication of a position of an edge of other bursts.

18. The system of claim 14, wherein the controller attempts to write the second bursts at the offset pattern.

19. A method to write burst information to a rotatable storage medium a data storage device comprising:
servowriting a first burst,
determining an indication of an offset of an edge of the first burst from a desired location; and
using the indication to determine an offset location for writing a second burst.

20. A method to write burst information to a rotatable storage medium of a data storage device comprising:
servowriting first bursts along a track,
determining indications of offsets of the edges of the first bursts from a desired track position; and
using the indications to determine an offset pattern for writing second bursts.

* * * * *

UNITED STATES PATENT AND TRADEMARK OFFICE
CERTIFICATE OF CORRECTION

PATENT NO. : 7,061,708 B2
APPLICATION NO. : 11/013075
DATED : June 13, 2006
INVENTOR(S) : Richard M. Ehrlich et al.

It is certified that error appears in the above-identified patent and that said Letters Patent is hereby corrected as shown below:

On The Title Page,
Item (73), delete "Inc." and insert therefore --Co., Ltd.--.

Column 2,
Line 8, after "bursts" insert --.--.

Column 4,
Line 56, delete "use" and insert therefore --used--.

Column 7,
Line 2, delete "mean" and insert therefore --means--.

Column 7,
Line 43, delete formula and insert correct formula below:

$$h_k \equiv \frac{1}{N}\sum_{m=0}^{N-1}\left[\frac{1+G_c(m)G_p(m)}{G_c(m)G_p(m)}\right]e^{j2\pi mk/N}$$

Column 9,
Line 13, delete "the of the" and insert therefore --of the--.

Signed and Sealed this

First Day of January, 2008

JON W. DUDAS
*Director of the United States Patent and Trademark Office*